United States Patent Office 3,457,129 Patented July 22, 1969

3,457,129

SKI REPAIRING

William S. Butcher, Concord, Mass., assignor to Scientific Associates, Inc., Concord, Mass., a corporation of Massachusetts No Drawing. Filed Dec. 22, 1964, Ser. No. 420,423
Int. Cl. B32b *35/00;* A63c *5/00*
U.S. Cl. 156—94 1 Claim

ABSTRACT OF THE DISCLOSURE

A method of repairing plastic bases of skis is provided by applying a thin heat-resistant abrasion-resistant sheet over a powdered high density polyethylene material placed on an area to be patched. The polyethylene material is heated to a temperature in the range of 290–350° F. and a patch formed by cooling of the polyethylene after which the sheet can be removed.

Plastic ski bases and particularly polyethylene ski bases have come into widespread use in recent years. Such skis frequently have wood, metal or fiberglass cores which act as rigidifying and strengthening members, and carry a base or running surface of a thin plastic layer. Polyethylene is commonly used as a base in about 50% of the skis now produced, and the use of polyethylene is growing constantly.

Polyethylene bases are subject to hard wear and in normal usage can be scratched, nicked or gouged by foreign objects over which the skis ride. Even small indentations caused by such use can affect the performance of skis and act as focal points for further damage to the ski bases.

An important object of this invention is to provide a means and method for rapidly and efficiently repairing indentations in plastic ski bases which method can be carried out by the ski owner without the need for professional help.

Another important object of this invention is to provide a means and method in accordance with the preceding object which results in a plastic base patch with substantially the same mechanical strength as the original undamaged base, and which adheres well to the original base.

Still another object of this invention is to provide a means and method in accordance with the preceding objects which results in a smooth, finished patch substantially continuous with the running surface provided by a plastic ski base, and which can provide a good color match with the original plastic base.

According to the invention, a patch is formed in a plastic ski base by the use of polyethylene particles which fill an indentation or other injury in the ski base and are then compacted and heated to their softening point or beyond to bond together and bond with surrounding plastic of the ski base. The means of this invention is preferred for use with polyethylene ski bases, but can be used with any other plastic base with which the polyethylene particles are compatible and bond to after heating. Preferably a kit is formed having polyethylene particles and a sheet of a high melting temperature which does not bond to polyethylene, such as polytetrafluoroethylene.

In the method of this invention, the polyethylene particles are poured into an indentation, which may comprise a scratch, nick or gouge in a plastic base, and the indentation is filled to a point slightly above its top edge usually provided by the flat surface of the ski base. The polytetrafluoroethylene sheet is then placed over the polyethylene particles and a hot iron is used to press against the polytetrafluoroethylene sheet and softens and preferably melts the polyethylene particles and surrounding polyethylene to a viscous liquid, whereupon the particles coalesce or fuse with each other and with the surrounding polyethylene base. The iron or other heating means is then removed and the polytetrafluoroethylene sheet is removed after the patch formed has cooled slightly. As soon as the patch formed has cooled to room temperature, the ski is ready for use.

The polyethylene particles used are preferably in powder form, having a particle size preferably in the range of from 20 to 140 mesh, U.S. standard sieve through which 95% of powder passes. The polyethylene is preferably high density polyethylene which given good mechanical strength and matches the properties the polyethylene normally used in ski bases. Densities of from about 0.912 to about 0.933 are preferred with melt indexes ranging from 1 to 70. "Microthene," 734 grade, a high density polyethylene sold by U.S. Industrial Chemicals Company, a division of National Distillers and Chemical Corporation of 99 Park Avenue, New York, has been found to be particularly useful for the polyethylene powder of this invention. "Microthene" 734 grade has a high density which results in a tough mechanically strong patch. In some cases, modified ethylene polymers can be substituted for the polyethylene of this invention.

The use of polyethylene powders is preferred, since such materials can be heated to form a fused or coalesced patch without over-heating the surrounding materials or the polyethylene powder itself which could cause thermal degradation.

The heat-resistant, thin, non-bonding cover sheet used over the powder during the patch-forming techniques can be any material which will transmit the required heat rapidly and which has a higher melting and softening point than either the polyethylene base or the polyethylene powder. The thin, heat resistant sheet must have the property of being non-bonding with the polyethylene powder or with the ski base after application of heat, so that it can be easily be removed from the patched area without any of the ski base or polyethylene powder adhering to it after the heating step. Another desirable property for the thin, heat-resistant sheet is a relatively smooth surface on the sheet to allow formation of a smooth finish on the patched area. Polytetrafluoroethylene, commonly known as Teflon, or substituted polytetrafluoroethylene, such as "Kel-F," are particularly desirable for use in this invention.

When polytetrafluoroethylene sheets are used, a sheet thickness of from about 5 to 15 mills is preferred, since thinner films or sheets can be difficult to handle and may lack mechanical strength, while thicker films increase heat transmission properties and are unnecessary. In some cases glass fiber or other imbedded reinforcement can be used in the thin, heat-resistant sheet.

The temperature required to form a patch in a plastic base in accordance with this invention will vary, depending upon the particular polyethylene powder used and the particular composition of the ski base. Normally temperatures in the range of from about 290 to about 350° F. are employed. The temperature is preferably derived from a hot household iron or other flat heating surface in contact with the Teflon sheet, which in turn overlies the powder which fills or slightly overflows the indentation. In this manner, the iron, having a flat surface, will apply a slight pressure to the overflowing powder so that when it coalesces or fuses, the powder will form an integral patch surface coextensive with the flat surface of the surrounding ski base. It should be understood that patches, as described herein, can be formed on curved or other surfaces in a similar manner.

In a specific example of this invention, a wood core ski, having a running surface of a thin, bonded layer of polyethylene, acting as a base with a thickness of one-quarter inch, is repaired. The polyethylene base had an indentation approximately one-sixteenth of an inch deep with a slightly oval shaped edge or rim on the running lower surface of the base covering a surface area of approximately one square inch. "Microthene" polyethylene powder, grade 734, having a mesh size of 50, a density of 0.933 and a melt index of 3, was poured into the indentation to fill and slightly overflow the indentation above the flat surrounding running surface of the base. A polytetrafluoroethylene, clear, colorless cover sheet, having a thickness of 10 mils, was placed over the damaged area in contact with the polyethylene powder and the surrounding running surface. A heated household iron on the cotton setting, at a temperature of 300° F., was hand-pressed against the upper surface of the cover sheet for 10 minutes until the color of the polyethylene base showed smoothly through the sheet and the powder softened to a viscous liquid. The iron was then removed, along with the polytetrafluoroethylene sheet, and it was found that a patch had been formed, having an outer surface coextensive with the running surface of the ski base. After cooling of the patch, the ski was used and the patch remained in place with the ski being repaired.

While a specific embodiment of this invention has been described, it should be understood that many variations thereof are possible. For example, various fillers, dyes and pigments may be incorporated in the polyethylene powder if desired. For example, the polyethylene powder may contain coloring agents so that it blends with the color of the surrounding polyethylene base where desired. While a clear, colorless polytetrafluoroethylene sheet is preferred for use in this invention, opaque or colored polytetrafluoroethylene sheets may be used. It is a feature of this invention that the temperature required for formation of the bond does not overheat the polyethylene base to cause thermal degradation thereof.

What is claimed is:

1. A method of repairing a polyethylene base of a ski having an indentation therein, said method comprising, filling said indentation with a powdered, high density, polyethylene material having a mesh size in the range of from 20 to 140 mesh and a density of from 0.912 to 0.933, applying a thin, heat-resistant, adhesion-resistant polytetrafluoroethylene sheet over said powdered, high-density polyethylene material, heating said powdered polyethylene material and an adjacent portion of said polyethylene base through said sheet to bond said powder into a patch adhered to said base at a temperature in the range from 290–350° F., cooling said patch to approximately room temperature, and removing said sheet.

References Cited

UNITED STATES PATENTS 2,622,056 12/1952 De Coudres et al. _ 156—333 XR
3,161,560 12/1964 Paquin et al. _______ 161—250

EARL M. BERGERT, Primary Examiner

H. F. EPSTEIN, Assistant Examiner

U.S. Cl. X.R.

280—11.13